(12) United States Patent
Frühling et al.

(10) Patent No.: US 10,629,872 B2
(45) Date of Patent: Apr. 21, 2020

(54) AUTONOMOUS UNDER WATER POWER SUPPLY DEVICE

(71) Applicants: THYSSENKRUPP MARINE SYSTEMS GMBH, Kiel (DE); thyssenkrupp AG, Essen (DE)

(72) Inventors: Christian Frühling, Kiel (DE); Marc Schiemann, Kiel (DE)

(73) Assignees: THYSSENKRUPP MARINE SYSTEMS GMBH, Kiel (DE); THYSSENKRUPP AG, Essen (DE)

( * ) Notice: Subject to any disclaimer, the term of this patent is extended or adjusted under 35 U.S.C. 154(b) by 259 days.

(21) Appl. No.: 15/542,956

(22) PCT Filed: Nov. 4, 2015

(86) PCT No.: PCT/EP2015/075672
§ 371 (c)(1),
(2) Date: Jul. 12, 2017

(87) PCT Pub. No.: WO2016/113010
PCT Pub. Date: Jul. 21, 2016

(65) Prior Publication Data
US 2017/0365828 A1 Dec. 21, 2017

(30) Foreign Application Priority Data
Jan. 16, 2015 (DE) .................. 10 2015 000 257

(51) Int. Cl.
*H01M 2/10* (2006.01)
*H01M 10/0525* (2010.01)
(Continued)

(52) U.S. Cl.
CPC ....... *H01M 2/1077* (2013.01); *H01M 2/1072* (2013.01); *H01M 2/1094* (2013.01);
(Continued)

(58) Field of Classification Search
None
See application file for complete search history.

(56) References Cited

U.S. PATENT DOCUMENTS

| | | | |
|---|---|---|---|
| 6,380,637 B1 * | 4/2002 | Hsu | B60L 58/34 290/1 R |
| 2005/0008904 A1 * | 1/2005 | Suppes | H01M 8/04089 429/9 |

(Continued)

FOREIGN PATENT DOCUMENTS

| | | |
|---|---|---|
| DE | 2812758 C | 7/1981 |
| DE | 9413638 U | 12/1995 |

(Continued)

OTHER PUBLICATIONS

English translation of International Search Report issued in PCT/EP2015/075672, dated Jan. 13, 2016 (dated Jan. 22, 2016).
English abstract JPH09301273.

*Primary Examiner* — Christopher P Domone
(74) *Attorney, Agent, or Firm* — thyssenkrupp North America, Inc.

(57) ABSTRACT

An energy supply apparatus may be modular and can be used underwater. In some examples, the modules comprise pressure vessels. The modules are chosen independently of each other from a group comprising a battery module, a fuel cell module, and air-independent Diesel module. The pressure vessels may be cylindrical and may have spherical segments disposed at ends segments of the pressure vessels. One or more of the spherical segments of the pressure vessels may be configured to be swiveled. Modules that are configured as battery modules may include battery elements, an inverter, a battery monitoring system, a separating unit, a control unit, a transformer, and/or a cooling unit.

13 Claims, 2 Drawing Sheets

(51) Int. Cl.
  *H01M 16/00* (2006.01)
  *H01M 10/06* (2006.01)
  *H01M 8/2475* (2016.01)
  *H02J 7/34* (2006.01)
  *H02J 7/32* (2006.01)
  *H02J 7/14* (2006.01)
  *H02J 1/00* (2006.01)
  *H01M 10/052* (2010.01)
  *H01M 8/1018* (2016.01)

(52) U.S. Cl.
  CPC ..... *H01M 8/2475* (2013.01); *H01M 10/0525* (2013.01); *H01M 10/06* (2013.01); *H01M 16/006* (2013.01); *H02J 1/00* (2013.01); *H02J 7/1415* (2013.01); *H02J 7/32* (2013.01); *H02J 7/34* (2013.01); *H01M 10/052* (2013.01); *H01M 2008/1095* (2013.01); *H01M 2220/20* (2013.01); *H01M 2250/20* (2013.01); *H02J 2300/30* (2020.01); *Y02E 60/122* (2013.01); *Y02E 60/126* (2013.01); *Y02T 90/32* (2013.01)

(56) References Cited

U.S. PATENT DOCUMENTS

| | | | |
|---|---|---|---|
| 2006/0246328 A1* | 11/2006 | Willets | H01M 16/006 307/45 |
| 2010/0041285 A1 | 2/2010 | Riggs | |
| 2014/0042975 A1* | 2/2014 | Miller | H02J 7/00 320/127 |
| 2014/0259618 A1* | 9/2014 | Damus | B22D 31/00 29/463 |

FOREIGN PATENT DOCUMENTS

| | | | |
|---|---|---|---|
| DE | 69126321 | T | 4/1998 |
| EP | 2194638 | A | 6/2010 |
| EP | 2666956 | A | 11/2013 |
| GB | 1511035 | A | 5/1978 |
| GB | 2250130 | A | 5/1992 |
| JP | H09301273 | A | 11/1997 |
| WO | 2001091206 | A | 11/2001 |
| WO | 2014065926 | A | 5/2014 |

* cited by examiner

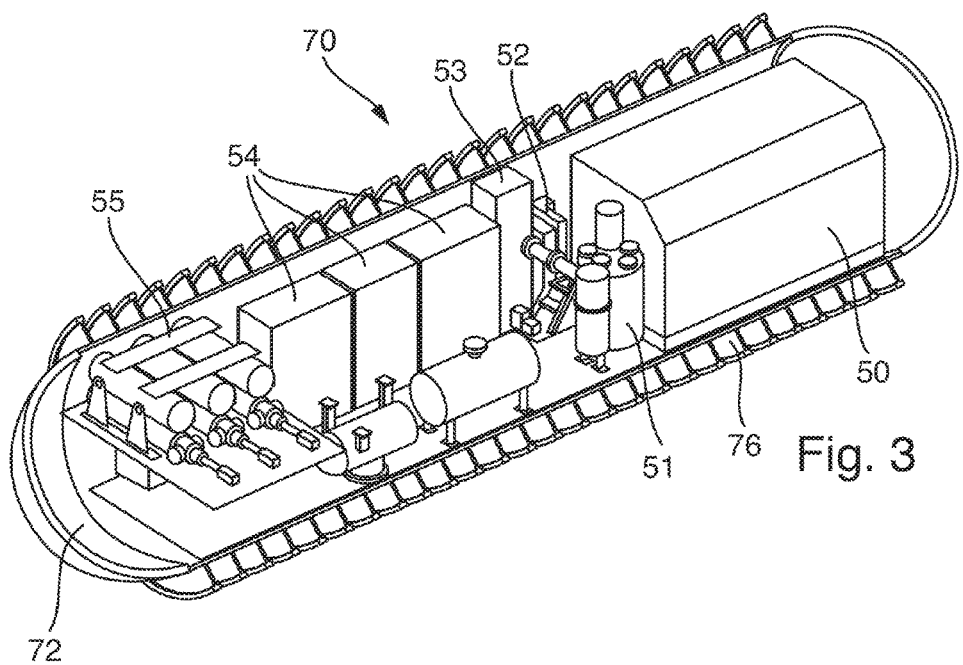
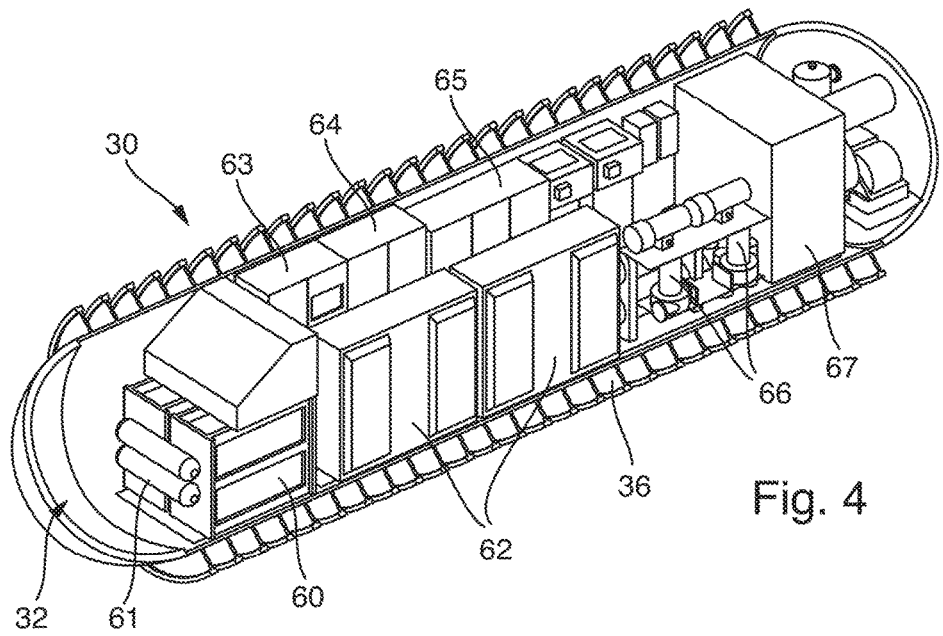

AUTONOMOUS UNDER WATER POWER SUPPLY DEVICE

CROSS REFERENCE TO RELATED APPLICATIONS

This application is a U.S. National Stage Entry of International Patent Application Serial Number PCT/EP2015/075672, filed Nov. 4, 2015, which claims priority to German Patent Application No. DE 10 2015 000 257.0 filed Jan. 16, 2015, the entire contents of both of which are incorporated herein by reference.

FIELD

The present disclosure generally relates to energy supply apparatuses, including energy supply apparatuses that are modular, are self-sufficient, and can be utilized underwater.

BACKGROUND

The seas are being used increasingly to harvest resources. Thus, for example, offshore wind parks are increasingly being built, and oil and gas have already for a long time been harvested even at great depths.

However, it is increasingly costly to provide the energy needed for the construction and operation of the plants by means of undersea cables. The laying of such cables may be a critical cost factor in the exploitation. In addition, the harvesting of raw materials in remote regions, such as beneath the Arctic, is gaining in importance. A power supply here from above the water surface is at times not possible, or not economical on account of the long supply lines required in that case.

It has therefore proven to be advantageous to provide apparatuses which are able to provide the necessary electrical energy on site and thus underwater.

From EP 2 666 956 A1 there is known a modular electrical apparatus which is located underwater and which can be used under high pressure at great depths where electrical energy is required.

From EP 2 194 638 A2 there is known a modular underwater power supply system.

From WO 2014/065926 A2 there is known a submersible power supply unit, offering the possibility of using power for charging of batteries.

From WO 01/91206 A2 there is known a fuel cell for energy supply underwater.

However, a problem is that the required amounts of energy can be very different. For example, during drilling operations or ramming operations a very large amount of energy in a relatively short time, and thus a high power, is required. In other applications, such as monitoring or control of relatively small underwater facilities, during standard operation often a very low power in the base load is required for a very long time, and at times the required power may be significantly higher in the short term.

Thus, the problem arises of providing an apparatus which provides electrical energy for consumers with very different power characteristics and energy characteristics underwater, in autonomous manner and independently of a connection to a supply system.

BRIEF DESCRIPTION OF THE FIGURES

FIG. 3 is a cutaway view of an example air-independent Diesel module.

FIG. 4 is a cutaway view of an example fuel cell module.

DETAILED DESCRIPTION

Figure 1:
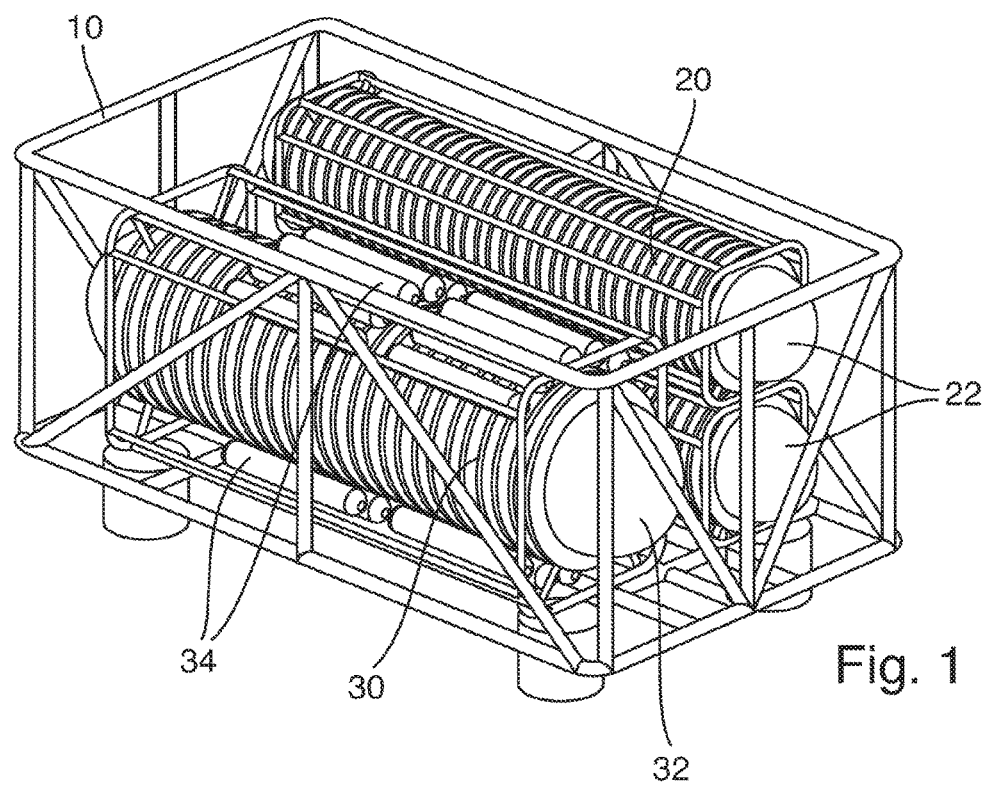
FIG. 1 is a perspective view of an example energy supply apparatus with three modules.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The energy supply apparatus according to the invention comprises at least a first module and a second module. The energy supply apparatus comprises a first pressure vessel and can therefore be used underwater. The first module comprises the first pressure vessel and the second module comprises a second pressure vessel. The first module and the second module are chosen independently of each other from the group of air-independent power generators, which group comprises a battery module, a fuel cell module, a Stirling motor, a Walter turbine and an air-independent Diesel module. A benefit of the energy supply apparatus according to the invention is its easy adaptability to the requirement for provision of energy. Since each module comprises its own pressure vessel, the modules can be easily assembled as needed. Battery modules are able to provide a large peak power, but only comprise a low level of energy. Fuel cell modules and air-independent Diesel modules are able to produce much larger amounts of energy, but have significantly lower power. By the combination of these different techniques it is possible to create an energy supply apparatus which is able to provide the required peak power as well as the required energy. Advantageously, a battery module can be recharged by another module, such as a fuel cell module or an air-independent Diesel module. The energy supply apparatus comprises a connection facility for an electrical consumer. The connection facility may be contained in a module.

Preferably, the energy supply apparatus is suitable for use at a depth of at least up to 100 m, more preferably for use at a depth of at least up to 300 m, even more preferably for use at a depth of at least up to 3000 m and more preferably still for use at a depth of at least up to 6000 m.

In another embodiment, the first pressure vessel and the second pressure vessel are cylindrical in design and each comprise at the end faces a first spherical segment and a second spherical segment. These spherical segments are also called caps. Preferably, at least one spherical segment of each pressure vessel is connected to the cylindrical portion of the pressure vessel in swiveable fashion. Alternatively, preferably at least one spherical segment of each pressure vessel can also be removable. Preferably, in each case precisely one spherical segment of each pressure vessel is connected to the cylindrical portion of the pressure vessel in swivelable fashion. In this way, it is possible to make it easy to place equipment inside the pressure vessel. At the same time, a pressure vessel can also be designed to be very stable in this way, even for great diving depths. Other pressure vessels of other modules are designed accordingly.

In another embodiment, the pressure vessels comprise reinforcing rings, so-called bulkheads, the reinforcing rings being arranged on the outside of the pressure vessels. A benefit of the arrangement of the reinforcing rings on the outside is that the interior region is planar and thus the equipment can be easily brought into the pressure vessel and secured there. Since the energy supply apparatus remains in a fixed position underwater, it is not necessary to streamline the exterior of the pressure vessels, as is the case with submarines, for example.

In another embodiment, the pressure vessels comprise a length of a 40-foot standard container. In this way, the modules have a dimension which corresponds in a first approximation to 12 m. This makes relatively easy manipulation possible. Thus, facilities already available can be used for the assembly and transport. The energy supply apparatus preferably comprises a length of 12.5 m to 13.5 m. In an alternative embodiment, the pressure vessels comprise a length of a 20-foot standard container. Preferably, in each of the aforementioned embodiments, the pressure vessels and/or the modules comprise connection means by which they can be secured to the ship and slings for hoisting equipment. In particular, the connection means are so-called container corners.

In another embodiment, the apparatus comprises a battery module. The battery module comprises battery elements and preferably an inverter, a battery monitoring system, a separating unit, a control unit, a transformer and/or a cooling unit. The aforementioned components are advantageously grouped into subassemblies, wherein the subassemblies preferably comprise a round cross section, the cross section of the subassemblies being slightly smaller than the inner diameter of the pressure vessel. In this way, the volume of the battery module is optimally utilized to provide the maximum amount of energy. For maintenance or repair, the subassemblies can be removed from the pressure vessel. For this purpose, the pressure vessel preferably comprises at least one swivel cap. The subassembly which comprises an inverter, a battery monitoring system, a separating unit, a control unit, a transformer and/or a cooling unit is preferably arranged on the side facing away from the swivel cap. The battery elements are preferably arranged in several subassemblies, one subassembly with battery elements preferably comprising a thickness of 0.5 m to 2 m. Especially preferably, the subassemblies with the battery elements are movably mounted on rails, so that the subassemblies can be more easily brought into their end position in the pressure vessel and taken out again.

In another embodiment, the apparatus comprises a battery module. The battery module comprises battery elements. Preferably the battery elements are chosen from the group comprising lead/gel storage batteries and lithium ion storage batteries.

In another embodiment, the apparatus comprises a battery module, wherein the pressure vessel of the battery module comprises a diameter of around 2 m. Smaller diameters have proven to be less economical, since with smaller diameters the proportion of the total weight made up by the pressure vessel increases. Likewise, the relative cost fraction which is due to the pressure vessel increases. Especially preferably, the diameter amounts to around 2 m and the length to around 12 m. In this way, a battery module corresponds in its dimensions to a 40-foot standard container and can accordingly be manipulated easily. For a battery module of this size, the resulting range of stored energy is 250 kWh to 5000 kWh. Preferably, by selection of the kind of battery and the number of battery cells, the storable energy of the battery module can be selected. For example, when using lithium ion cells, a stored energy of around 2500 kWh is achieved, and when using lead/gel cells a stored energy of around 750 kWh is achieved.

In another embodiment, the apparatus comprises a fuel cell module, wherein the pressure vessel of the fuel cell module comprises a diameter of around 3 m. A diameter of the pressure vessel of around 3 m has proven to be advantageous in order to be able to hold besides the fuel cells also the control and regulating equipment, as well as the additional components, such as transforming equipment, pumps and compressors. If liquid oxygen is used as the oxygen source, an evaporator for oxygen may also be present. Advantageously, the different components are mounted in separate subassemblies with circular cross section. For maintenance and repair, these may then be removed from the pressure vessel. This enables a compact construction and thus a small overall size.

In another embodiment, the apparatus comprises a fuel cell module, wherein the fuel cell module comprises at least a first fuel cell tank for oxygen and at least a second fuel cell tank for hydrogen. The first fuel cell tank for oxygen can preferably be designed as a pressure tank for gaseous oxygen or as a tank for liquid oxygen. The second fuel cell tank for hydrogen can preferably be designed as a pressure tank for gaseous hydrogen or as a metal hydride storage means. Especially preferably, the first fuel cell tank and the second fuel cell tank are arranged outside the pressure vessel.

In another embodiment, the apparatus comprises a fuel cell module, wherein the fuel cell module comprises a polymer electrolyte membrane fuel cell. Polymer electrolyte membrane fuel cells have the advantage of a low operating temperature. Thus, a costly temperature control can be avoided.

In another embodiment, the apparatus comprises an air-independent Diesel module, wherein the pressure vessel of the air-independent Diesel module comprises a diameter of 3 m. A diameter of the pressure vessel of around 3 m has proven to be advantageous in order to be able to hold besides the Diesel generator also the control and regulating equipment, as well as the other optional components, such as transforming equipment, a $CO_2$ absorber and a water management system. If liquid oxygen is used as the oxygen source, an evaporator for oxygen may also be present. Advantageously, the different components are mounted in separate subassemblies with circular cross section. For maintenance and repair, these may then be removed from the pressure vessel. This enables a compact construction and thus a small overall size. A $CO_2$ absorber can advantageously be designed so that the $CO_2$ produced by the combustion is dissolved in sea water and given off to the surroundings. In order to maintain the pressure in the circuit, argon may be used with advantage.

In another embodiment, the apparatus comprises an air-independent Diesel module, wherein the air-independent Diesel module comprises at least a first Diesel module tank for liquid oxygen and at least a second Diesel module tank for Diesel. The first Diesel module tank and the second Diesel module tank are especially preferably arranged outside the pressure vessel. In another embodiment, the first Diesel module tank and the second Diesel module tank can be accommodated in a storage apparatus separate from the energy supply apparatus, the energy supply apparatus and the storage apparatus being connected to each other by means of pressure-tight hoses or pipes. This has the advantage that the storage apparatus can be replaced independently of the energy supply apparatus. In this way, the operation of the energy supply apparatus can be assured even for a long time, even at inaccessible locations.

In another embodiment, the apparatus comprises an air-independent Diesel module, wherein the air-independent Diesel module comprises an absorber. The absorber serves to remove from the closed circuit the $CO_2$ produced by the burning of the Diesel. Especially preferably, the $CO_2$ is absorbed by sea water and thus given off to the surroundings. Alternatively, the absorber can also bind $CO_2$ chemically.

In another embodiment, the apparatus comprises a framework, wherein the modules are connected to the framework. The advantage of this embodiment is that the energy supply apparatus itself is comparatively light, but at the same time it is stable enough to hold the modules. What is more, the modules can be comparatively easily placed in a framework and replaced. It is also possible to introduce the modules only underwater at the site of use, if the energy supply apparatus with all the modules is too heavy altogether to be moved efficiently as a whole over water and be brought to the site of use. In particular, the weights of the modules are chosen so that they can be moved with ordinary hoisting means on the transport ship. Especially preferably, the weight of the modules is less than 150 tons.

In another embodiment, the first module is a battery module and the second module is chosen from the group comprising a fuel cell module, a Stirling motor, a Walter turbine and an air-independent Diesel module. Especially preferably, the second module is from the group comprising a fuel cell module and an air-independent Diesel module.

In another embodiment, the apparatus comprises a third module, wherein the first module and the second module are battery modules and the third module is a fuel cell module or an air-independent Diesel module. For most applications it has proven to be sufficient to keep a single fuel cell module or an air-independent Diesel module on hand for the base load. But in order also to be able to handle peak loads, two battery modules are advantageous, since the level of energy stored in one battery module is low. Moreover, thanks to the use of two battery modules an optimal battery management system can be employed, which optimally utilizes the lifetime of the batteries. If no peak load is required, the battery modules are charged by the fuel cell module or the air-independent Diesel module.

In other embodiments, combinations of a module are preferred in particular which are chosen from the group comprising a fuel cell module, a Stirling motor, a Walter turbine and an air-independent Diesel module, as well as four, six or eight battery modules. It is particularly preferable here to select the first module from the group comprising a fuel cell module and an air-independent Diesel module.

FIG. 1 shows an exemplary energy supply apparatus. It comprises a framework 10. In the framework 10 there are three modules, two battery modules 20 and one fuel cell module 30. The modules comprise a length of around 12 m, the pressure vessels of the battery modules 20 comprise a diameter of around 2 m and the pressure vessel of the fuel cell module comprises a diameter of around 3 m. The framework 10 comprises a length of around 14 m, a width of around 6.5 m and a height of around 5 m. The battery modules 20 comprise swivel caps 22 and the fuel cell module 30 comprises a swivel cap 32. In addition, the fuel cell module 30 comprises pressure tanks 34, in which hydrogen or oxygen is stored under pressure in the gaseous state. Such an energy supply apparatus can on the one hand deliver a high short-term power and on the other hand cover a low base load for a very long time thanks to the fuel module 30.

Figure 2:
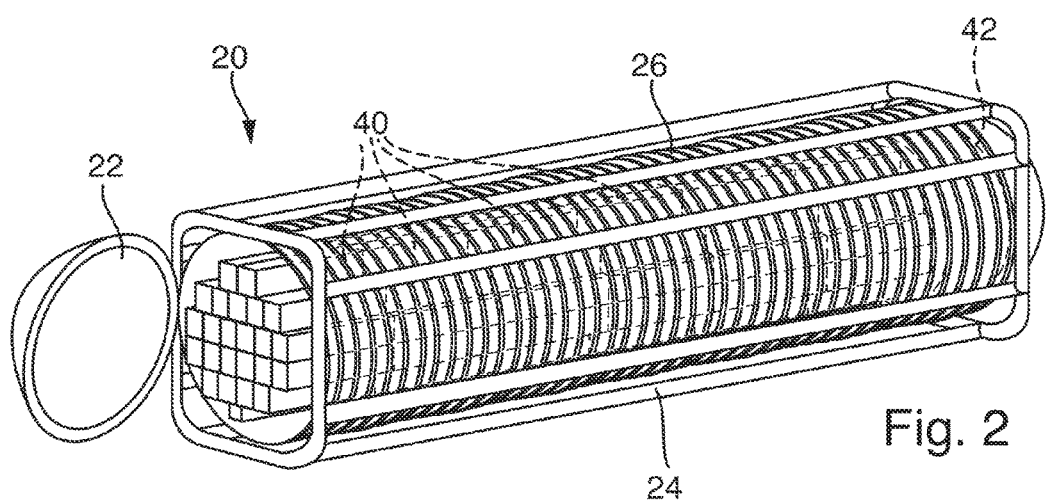
FIG. 2 is a semi-transparent perspective view of an example battery module.

FIG. 2 shows a battery module 20 in half-transparent representation. Access to the pressure vessel 26 occurs via the swivel cap 22. At the end of the pressure vessel 26 opposite the swivel cap 22 is arranged a control subassembly 42, which comprises an inverter, a battery monitoring system, a separating unit, a control unit and a cooling unit. Furthermore, six subassemblies with battery elements 40 are arranged in the battery module 20, comprising a diameter of around 2 m and a depth of around 1.8 m. The battery elements are in compact arrangement, since there is no maintenance during use underwater. For maintenance and repair, the subassemblies with battery elements 40 are removed through the swivel cap 22 from the pressure vessel 26 while the battery module 20 is on land or on a maintenance ship.

FIG. 3 shows an air-independent Diesel module 70 with a pressure vessel 76 and a swivel cap 72. Inside the pressure vessel 76 the subassemblies are arranged preferably according to their respective need for maintenance, the subassembly with the least need for maintenance being arranged at the side facing away from the swivel cap 72. The air-independent Diesel module 70 contains a Diesel generator 50. For discharging the $CO_2$ produced during combustion there is an absorber 51, in which the $CO_2$ is dissolved in sea water and given off to the surroundings. Furthermore, the thermal process control can be assured via the heat exchanger 52. Furthermore, the air-independent Diesel module 70 contains a switch cabinet 53 and switchboards 54 as well as a water management system 55. Storage tanks for Diesel and liquid oxygen are arranged outside the pressure container 76 and are not shown. The pressure container 76 comprises a length of around 12 m and a diameter of around 3 m.

FIG. 4 shows a fuel cell module 30 with a pressure vessel 36 with swivel cap 32. Inside the pressure vessel 36 the subassemblies are arranged preferably according to their respective need for maintenance, the subassembly with the least need for maintenance being arranged at the side facing away from the swivel cap 32. In the pressure vessel 36 is found the fuel cell 60, preferably a polymer electrolyte membrane fuel cell. For use of liquid oxygen as oxidizing agent, the fuel cell module 30 has an evaporator 61. Moreover, the fuel cell module 30 comprises a DC converter 62, a control console 63, a switch cabinet 64, an additional switch cabinet 65 as well as pumps 66 and a compressor 67. The pressure container 36 comprises a length of around 12 m and a diameter of around 3 m.

REFERENCE SYMBOLS

10 Framework of the energy supply apparatus
20 Battery module
22 Swivel cap of the battery module
24 Framework of the battery module
26 Pressure vessel of the battery module
30 Fuel cell module
32 Swivel cap of the fuel cell module
34 Pressure tanks
36 Pressure vessel of the fuel cell module
40 Subassembly with battery elements 42 Control subassembly
50 Diesel generator
51 Absorber
52 Heat exchanger
53 Switch cabinet
54 Switchboard
55 Water management system
60 Fuel cells
61 Evaporator
62 DC converter
63 Control console
64 Switch cabinet
65 Additional switch cabinet
66 Pumps
70 Compressor
72 Air-independent Diesel module
76 Swivel cap of the air-independent Diesel module
76 Pressure vessel of the air-independent Diesel module

What is claimed is:

1. An energy supply apparatus comprising:
   a first module comprising a first pressure vessel, wherein the first module comprises a first air-independent power generator configured as a battery module;
   a second module comprising a second pressure vessel, wherein the second module comprises a second air-independent power generator configured as a fuel cell module, a Stirling motor, a Walter turbine, or an air-independent Diesel module; and
   a framework, wherein the first and second modules are connected to the framework.

2. The energy supply apparatus of claim 1 wherein the first pressure vessel and the second pressure vessel is cylindrical and each comprise spherical segments at end faces, wherein at least one of the spherical segments of each of the first and second pressure vessels is configured to be swiveled.

3. The energy supply apparatus of claim 1 wherein the first pressure vessel and the second pressure vessel each has a length of 40 feet.

4. The energy supply apparatus of claim 1 further comprising a battery module that comprises:
   battery elements;
   an inverter;
   a battery monitoring system;
   a separating unit;
   a control unit;
   a transformer; and
   a cooling unit.

5. The energy supply apparatus of claim 1 further comprising a battery module that comprises at least one of:
   battery elements;
   an inverter;
   a battery monitoring system;
   a separating unit;
   a control unit;
   a transformer; or
   a cooling unit.

6. The energy supply apparatus of claim 1 further comprising a battery module with a third pressure vessel having a diameter of about 2 meters.

7. The energy supply apparatus of claim 1 further comprising a fuel cell module with a third pressure vessel having a diameter of about 3 meters.

8. The energy supply apparatus of claim 1 further comprising a fuel cell module, the fuel cell module comprising a first fuel cell tank for oxygen and a second fuel cell tank for hydrogen.

9. The energy supply apparatus of claim 1 further comprising a fuel cell module with a polymer electrolyte membrane fuel cell.

10. The energy supply apparatus of claim 1 further comprising an air-independent Diesel module with a third pressure vessel having a diameter of about 3 meters.

11. The energy supply apparatus of claim 1 further comprising an air-independent Diesel module, the air-independent Diesel module comprising a first Diesel module tank for liquid oxygen and a second Diesel module tank for Diesel.

12. The energy supply apparatus of claim 1 further comprising an air-independent Diesel module, the air-independent Diesel module comprising an absorber.

13. The energy supply apparatus of claim 1 further comprising a third module configured as a fuel cell module, a stirling motor, a walter turbine, or an air-independent diesel module.

* * * * *